United States Patent
Corfield

(10) Patent No.: US 9,396,726 B2
(45) Date of Patent: Jul. 19, 2016

(54) SYSTEM AND METHODS TO CREATE AND DETERMINE WHEN TO USE A MINIMAL USER SPECIFIC LANGUAGE MODEL

(71) Applicant: nVoq Incorporated, Boulder, CO (US)

(72) Inventor: Charles Corfield, Boulder, CO (US)

(73) Assignee: NVOQ INCORPORATED, Boulder, CO (US)

( * ) Notice: Subject to any disclaimer, the term of this patent is extended or adjusted under 35 U.S.C. 154(b) by 55 days.

(21) Appl. No.: 14/315,420

(22) Filed: Jun. 26, 2014

(65) Prior Publication Data
US 2015/0379988 A1   Dec. 31, 2015

(51) Int. Cl.
*G10L 15/183* (2013.01)
*G10L 15/01* (2013.01)

(52) U.S. Cl.
CPC ............... *G10L 15/183* (2013.01); *G10L 15/01* (2013.01)

(58) Field of Classification Search
CPC combination set(s) only.
See application file for complete search history.

(56) References Cited

U.S. PATENT DOCUMENTS 6,430,551 B1 *   8/2002   Thelen .................. G09B 19/06
2011/0004462 A1 *   1/2011   Houghton ............ G10L 15/183
                                                              704/9

* cited by examiner

*Primary Examiner* — Barbara Reinier
(74) *Attorney, Agent, or Firm* — Perkins Coie LLP

(57) ABSTRACT

The technology of the present application provides apparatuses and methods that may be used to generate the smallest language model for a continuous speech recognition engine that covers a given speaker's speech patterns. The apparatuses and methods start with a generic language model that is an approximation to the given speaker's speech patterns. The given speaker generates corrected transcripts that allows for the generation of a user specific language model. Once the user specific language model is sufficiently robust, the continuous speech recognition system may replace the generic language model with the user specific language model.

27 Claims, 14 Drawing Sheets

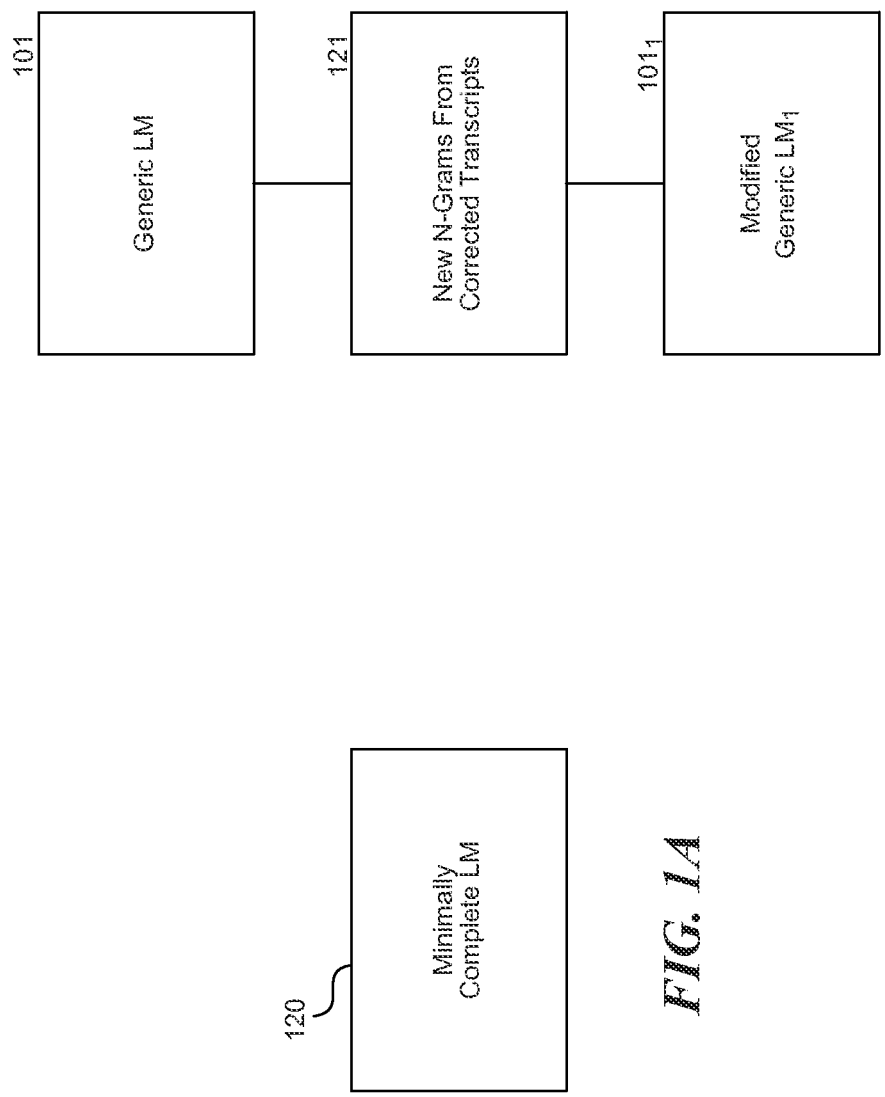

SYSTEM AND METHODS TO CREATE AND DETERMINE WHEN TO USE A MINIMAL USER SPECIFIC LANGUAGE MODEL

CLAIM OF PRIORITY UNDER 35 U.S.C. §§119 AND 120

None.

REFERENCE TO CO-PENDING APPLICATIONS FOR PATENT

None.

BACKGROUND

1. Field

The technology of the present application relates generally to speech recognition systems, and more particular, to apparatuses and methods to create and use a minimally complete user specific language model.

2. Background

Early speech to text engines operated on a theory of pattern matching. Generally, these machines would record utterances spoken by a person, convert the audio into a sequence of possible phonemes, and then find a sequence of words that is allowed by the pattern and which is the closest, or most likely, match to the sequence of possible phonemes. For example, a person's utterance of "cat" provides a sequence of phonemes. These phonemes can be matched to reference phonetic pronunciation of the word "cat". If the match is exact or close (according to some algorithm), the utterance is deemed to match "cat"; otherwise, it is a so-called "no-match". Thus, the pattern matching speech recognition machine converts the audio to a machine readable version "cat." Similarly, a text to speech engine would read the data "cat", convert "cat" into its phonetic pronunciation and then generate the appropriate audio for each phoneme and make appropriate adjustments to the "tone of voice" of the rendered speech.

Pattern matching machines, however, have limitations. Generally, pattern matching machines are used in a speaker independent manner, which means they must accommodate a wide range of voices and which limits the richness of patterns that will provide good matches across a large and diverse population of users.

Pattern matching speech recognition engines are of value because they are deployable and usable relatively rapidly compared to natural language or free form, continuous speech recognition engines. They can recognize simple formulaic responses with good accuracy. However, as they are not overly robust, pattern matching speech recognition is currently of limited value because it cannot handle free form speech, which is akin to pattern matching with an extremely large and complex pattern.

In view of these limitations, speech recognition engines have moved to a free, form continuous or natural language speech recognition system. The focus of natural language systems is to match the utterance to a likely vocabulary and phraseology, and determine how likely the sequence of language symbols would appear in speech. Continuous speech recognition engines return sequences of words which are the best fit for the audio. For a given sequence of words, the fit is a combination of two scores (or probabilities): one score indicates how well the phonemes for the words match the supplied audio; and the other is the likelihood of that sequence (of words) given the supplied language model (hereinafter "language model" or "LM"). Similar sounding sequences of words will have similar phonemic scores (how well their phonemes match the audio). However, the same similar sounding sequences may have quite different likelihoods when scored by the language model. The LM provides a powerful model to direct a word search based on predecessor words for a span of n words. In other words, a natural language or free form speech recognition engine uses an acoustic model to match phonemes and a language model to determine whether a particular word or set of words is more likely than another word or set of words.

The LM uses probability to select the more likely words for similar sounding utterances. For example, the words "see" and "sea" are pronounced substantially the same in the United States of America. Using the LM, the speech recognition engine would populate the phrase: "Ships sail on the sea" correctly because the probability indicates the word "sea" is more likely to follow the earlier words in the sentence.

The mathematical model which determines what phoneme sequence(s) are the best match to the supplied audio is called the Hidden Markov Model. The details of the hidden Markov model are well known in the industry of speech recognition and will not be further described herein.

Developing a LM, as mentioned above, is reasonably well known in the industry; the details of the development will, therefore, not be discussed herein in detail. However, by way of background, a general overview of the operation of a language model will be explained. Conventionally, the language model is a statistical model of word sequences, but for sake of generality, a model may contain other information that is used in the selection of word sequences, such as domain expertise about what word sequences are possible or not possible in that domain. Without loss of generality, we will use statistical language models as exemplars of language models in our discussion, since they are well known and understood by those familiar with speech recognition. A (statistical) language model is generally calculated from a corpus of words. The corpus, generally, is obtained from written text samples with the assumption that the written text is a good approximation of the spoken word. The corpus may include, among other things, text books, emails, transcriptions, notes, papers, presentations, or the like. Using the corpus, the language model provides summary statistics on the occurrence of unigrams, bigrams, and trigrams (i.e., n-grams up to some cutoff value, which is usually three or four). For example, how often a single word appears in the language (a "unigram"), such as, for example, the word "sea" as identified above, how often a combination of two words in a particular order appear in the language (a "bi-gram"), such as, for example, "the sea", how often a combination of three words appear in a particular order (a "tri-gram"), such as, for example, "on the sea", how often a combination of four words in a particular order appear in the language (a "quadra-gram"), such as, for example, "sail on the sea", and so on. While the language model can extend to penta-grams, hexa-grams and so on, there is currently a practical limit on the processing power and memory requirements for the speech recognition engine. Also, for simplicity, the technology of the present application will generally be explained with respect to tri-gram engines; although, the technology explained herein is applicable to a language model using any length of word sequences.

In operation, a conventional speech recognition system or engine for continuous speech recognition uses a combination of hidden Markov models (HMMs) and LMs to convert an audio signal into a transcript. The HMMs support the conversion of an acoustic signal into phonemes, while the LMs support the conversion of phonemes into sequences of words.

Conventionally, these scores are expressed as probabilities, but they don't have to be. What is important is that you can combine both scores into a single overall score, so that the word sequences with the highest overall scores are the best matches to what was said. While scoring a given sequence of words is straight forward, the task of rapidly generating plausible sequences while discarding implausible ones is the core of the computation inside a recognition engine. In principle, you can combine the audio and language model scores with other scoring systems: e.g., grammar or domain specific knowledge, as is generally known in the art, but not further discussed herein, as it is unnecessary for an understanding of the technology of the present application. As mentioned above, LMs contain the probabilities that a given word will be seen after a (specified) preceding word sequence, the length of the preceding sequence is two (for 3-gram models) or three (for 4-gram models). In general, the length of the preceding sequence is arbitrary. However, due to constraints in computer speed and memory, commonly available recognizers today are limited to either 3-gram (most common) or 4-gram (less common) LMs. The technology of the present application will be explained using 3-gram (trigram) LMs, with the understanding that the discussion readily extends to higher or even lower order LMs.

The LM is prepared from a collection of transcripts known as a corpus as explained above. An analyzer, in the form of a program operating on a processor, discovers all the individual words that occur in the corpus, plus all the bigrams (word pairs) and trigrams (word triplets), and it lists everything it finds in a table. Each entry has the probability of the n-gram plus a back-off weight if the entry is for a 1- or 2-gram, but not for a 3-gram (if the LM is order N, then there are back-off weights for the lower order n-grams where n<N). If you see an n-gram in the table, you know it appeared in the corpus. The purpose of the back-off weights is to give the LM flexibility to estimate the probabilities of bigrams and trigrams that did not occur in the corpus, but could reasonably be expected to occur in real-world use. In other words, there is an implicit assumption that the corpus is "incomplete" and the LM should accommodate this—but how? Let us start with the section of the LM which lists all the different words found in the corpus (i.e., the 1-grams). Pick three of those words at random: w1, w2, w3, and then ask the question "What is the probability predicted by the LM for w3 to occur after w1 and w2?" To find the answer, we look at all the entries in the 3-gram section of the LM to see if there is an entry for "w1 w2 w3". If there is, use the probability that was recorded for this trigram. If we cannot find an entry for "w1 w2 w3", we back-off from requiring a 3 word sequence and look for the two word sequence "w2 w3". If we find an entry for "w2 w3", we use its probability and multiply by the back-off weight for "w1 w2" (or 1.0 if we cannot find a back-off weight). If there is no entry for "w2 w3", we back-off from using w2 and look up the probability of "w3" in isolation (which is recorded in the unigram section of the model) and multiply by the back-off weight for w2. Recapping: the LM lets us estimate the probability that any n-gram that can be made from the words in the LM. The fact that a probability can be estimated does not mean it is true in the real world, however, it is what the recognition engine will use for its best guess (or guesses if you are using "N-best") as to what the speaker said.

While a powerful tool, the LM conventionally is generic across multiple similarly situated users and in thus it is at risk of being a "Jack of all trades, and master of none". In particular, the corpus of material is often generated from a large volume of material, none of which may have been generated from any of the current users of the speech recognition system or engine using the LM. The LM may include n-grams that the actual speaker may, in fact, never use. Additionally, the LM may not include n-grams that the actual speaker does use. This results in errors and inefficiencies.

Thus, against this background, it is desirable to provide a user specific language model.

SUMMARY

To attain the advantages and in accordance with the purpose of the technology of the present application, methods and apparatuses to improve free form speech recognition and provide a minimal user specific language model that more readily matches n-grams based on the user's actual speech characteristics.

In certain aspects, the technology of the present application provides a minimal user specific language model that is generated using a corpus of user specific transcripts. The technology of the present application determines when an approximation of a minimal user specific language model is sufficient (i.e., good enough) to replace the generic language model.

The technology of the present application may determine the user specific language model is sufficient to replace the generic language model when there are less n-grams missing from the user specific language model than the generic language model. In other aspects, the technology of the present application may determine to replace the generic language model with the user specific language model when the user specific language model has a higher average n-gram probability or a lower perplexity than the generic language model. In still other aspects, the technology of the present application may determine to replace the generic language model with the user specific language model when the number of missing n-grams from the user specific language model is less than the number of unused n-grams in the generic language model multiplied by an audio quality parameterized factor $\alpha$.

The technology of the present application also provides for the generation of a user specific language model. In certain aspects, the user specific language model comprises only n-grams actually produced by a specific user's speech patterns.

The foregoing and other features, utilities and advantages of the invention, will be apparent from the following more particular description of a preferred embodiment of the invention as illustrated in the accompanying drawings.

BRIEF DESCRIPTION OF THE DRAWINGS

Various examples of the technology of the present application will be discussed with reference to the appended drawings. These drawings depict only illustrative examples of the technology and are not to be considered limiting of its scope, which is defined by the claims.

FIG. 1A is a diagram of a minimally complete language model usable with the speech recognition system of FIG. 1;

FIG. 1B is a flowchart illustrative of a methodology of modifying a generic language model used by the speech recognition system of FIG. 1;

DETAILED DESCRIPTION

The technology of the present application will now be explained with reference to the figures. While the technology of the present application is described with relation to a speech recognition system using a tri-gram language model, one of ordinary skill in the art will recognize on reading the disclosure that the technology of the present application is usable with a bi-gram language model or more than a tri-gram language model. Also, while the technology of the present application is described with specific examples of language models and speech recognition, one of ordinary skill in the art will now recognize that the technology of the present application is usable regardless of the specific recognition algorithms.

The technology of the present application will be described with reference to particular discrete processors, modules, or parts, but one of ordinary skill in the art will recognize on reading the disclosure that processors may be integrated into a single processor or server, or separated into multiple processors or servers. Moreover, the technology of the present application will be described generically and portions of the present application may be loaded onto a particular user's client device (fat or thick client) or hosted by a server that is accessed by the client device (thin client). Additionally, the technology of the present application is described with regard to certain exemplary embodiments. The word "exemplary" is used herein to mean "serving as an example, instance, or illustration." Any embodiment described herein as "exemplary" is not necessarily to be construed as preferred or advantageous over other embodiments. All embodiments described herein should be considered exemplary unless otherwise stated.

Figure 1:
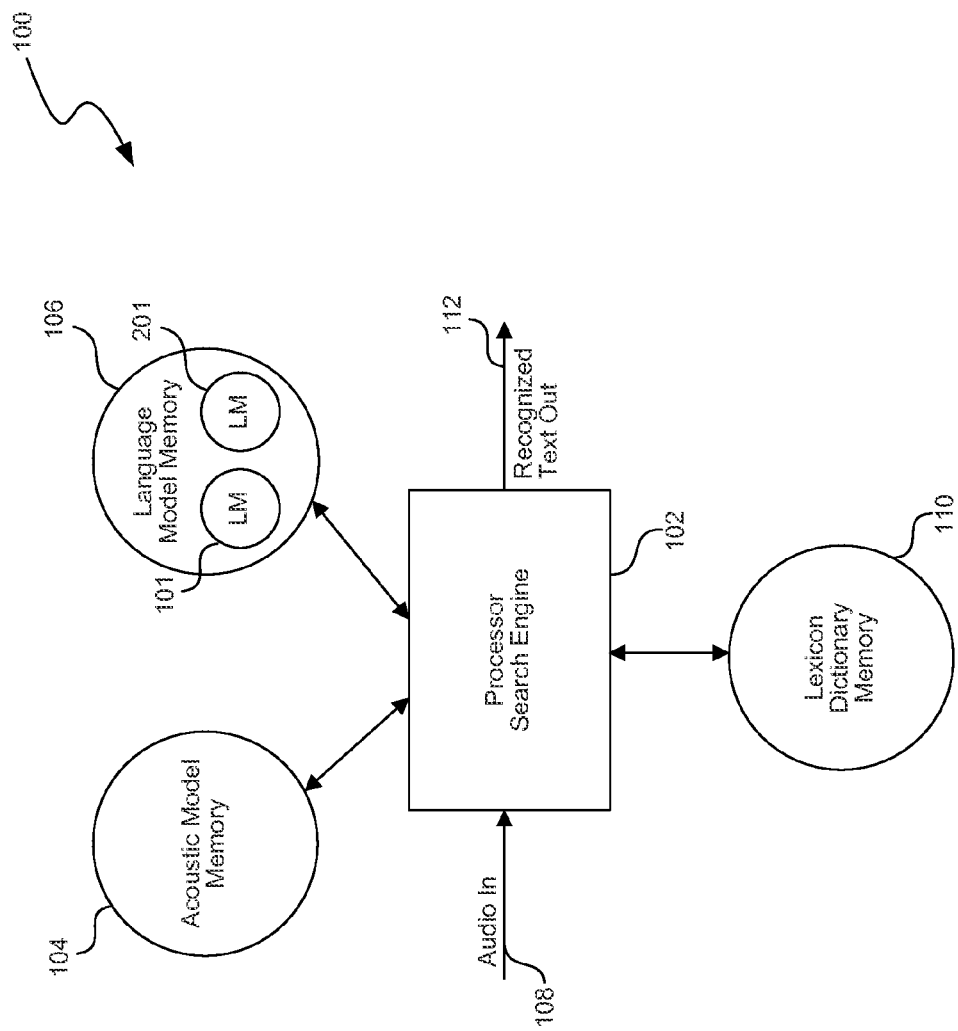
FIG. 1 is a functional block diagram of a speech recognition system consistent with the technology of the present application.

Referring now to FIG. 1, part of a free form, continuous speech recognition system 100 is provided for reference. The speech recognition system 100 includes a processor 102 that is configured to run a search algorithm by executing code contained in one or more operatively linked memories as outlined below. The processor 102 may be a single processor as shown or several processors operatively coupled together. The processor 102 is coupled to an acoustic model memory 104 and a language model memory 106. The acoustic model memory 104 and the language model memory 106 may be separate as shown or combined into a common memory.

An audio data stream 108 is received by the processor 102. The audio data stream 108 may be digitized. Alternatively, the processor 102 may include a digitizer or an analog-to-digital converter not specifically shown. The processor 102 takes the audio data stream 108, and using the search algorithms, determines in conjunction with the acoustic model memory 104 at least one phoneme sequence that matches the supplied audio. The at least one phoneme sequence is generally scored or has a probability that the audio matches the at least one phoneme sequence. The processor 102 also uses the search algorithms in conjunction with a language model 101 stored in the language model memory 106 to determine the likelihood or probability that the audio is at least one sequence of words, and generally predicts one or more likely next words not yet supplied to the processor 102 for recognition. The language model memory 106 is provided with a second language model 201, which will be explained further below.

The processor 102 uses a lexicon dictionary memory 110 to score the at least one word sequence against the audio data stream 108, which may include matching the phonemes of the at least one word sequence with the phonemes of the audio. The processor 102 combines the scores using one of several known recognition algorithms to output the recognized text 112. The description of the speech recognition engine 100 is, by way of background, for context of the technology of the present application as speech recognition is known in the art. Moreover, the technology of the present application is usable with any known speech recognition engine that uses a language model.

Ideally, the language model 101 for any given speaker would be a minimally complete LM 120 (see FIG. 1A). The minimally complete LM 120 would contain all the n-grams in the speaker's speech patterns and no more. However, the LM 101 provided with the continuous speech recognition engine 100 is, at most, a best-guess LM for any given user as it is generated by a corpus of material acquired from a number of similarly situated people. Thus, the continuous speech recognition engine 100 is unlikely to have the minimally complete LM 120 for any given or new user. Thus, the LM 101, which may be referred to as the original LM, the best-guess LM, or generic LM is one representing a combination of n-grams from a number of similarly situated speakers—who are believed to be similar to the target user or actual speaker. Consequently, the original LM 101 may contain both too many and too few n-grams. By "too many", we mean n-grams that other speakers use, but which are not used by the target speaker. By "too few", we mean n-grams which the target speaker uses, but which are not used by the speakers who contributed to the LM, generally meaning the actual n-gram has to be identified using the back-off weights described above that are more likely to lead to errors.

In short, the original LM 101 for a new user has at least two problems: (i) it has n-grams that the speaker never uses, which can lead to unexpected content (the recognizer "wanders off the reservation"); (ii) it is missing n-grams that the speaker uses, which leads to recognition failures. The conventional remedies, for the above problems involve combining the generic LM 101 with supplemental statistics from (corrected) transcripts, which may include adding new n-grams 121 for the particular user that are missing from the generic LM 101 as shown in FIG. 1B. Eventually, this fills the "holes" in the generic LM 101 and provides a modified generic LM 101$_1$, but it does not remove any of the surplus or "too many" n-grams, which can give rise to unexpected content. It is conventional practice to use one LM to transcribe all of a user's speech, even if that LM 101$_1$ is a composite of a generic specialty plus user specific LM elements. A generic specialty refers to a language model for a niche speech recognition application. Such a niche speech recognition application would have the language model developed from a corpus of material specific to that niche or specialty that would generally not be associated with common language usage. For example, the corpus used to develop the language model for forensic accounting, neuroscience, internal medicine, patent law, or the like would provide n-grams that are specific to that niche. Thus, the language model would be a specialty language model, yet generic, as it would be used for all users in that niche using that speech recognition application. The modified generic LM 101$_1$ for generic language model or a specialty generic language model would include the addition of n-grams actually used by each of the various users of the modified generic LM 101$_1$, and would potentially include many n-grams not used by any specific user. Thus, conventional solutions to gaps in the generic LM 101 lead to implementations that continually add n-grams to a generic LM as new user specific n-grams surface. The technology of the present application, alternatively, provides a user specific language model that is defined as the minimally complete LM 120, which will be explained further below.

Figure 2:
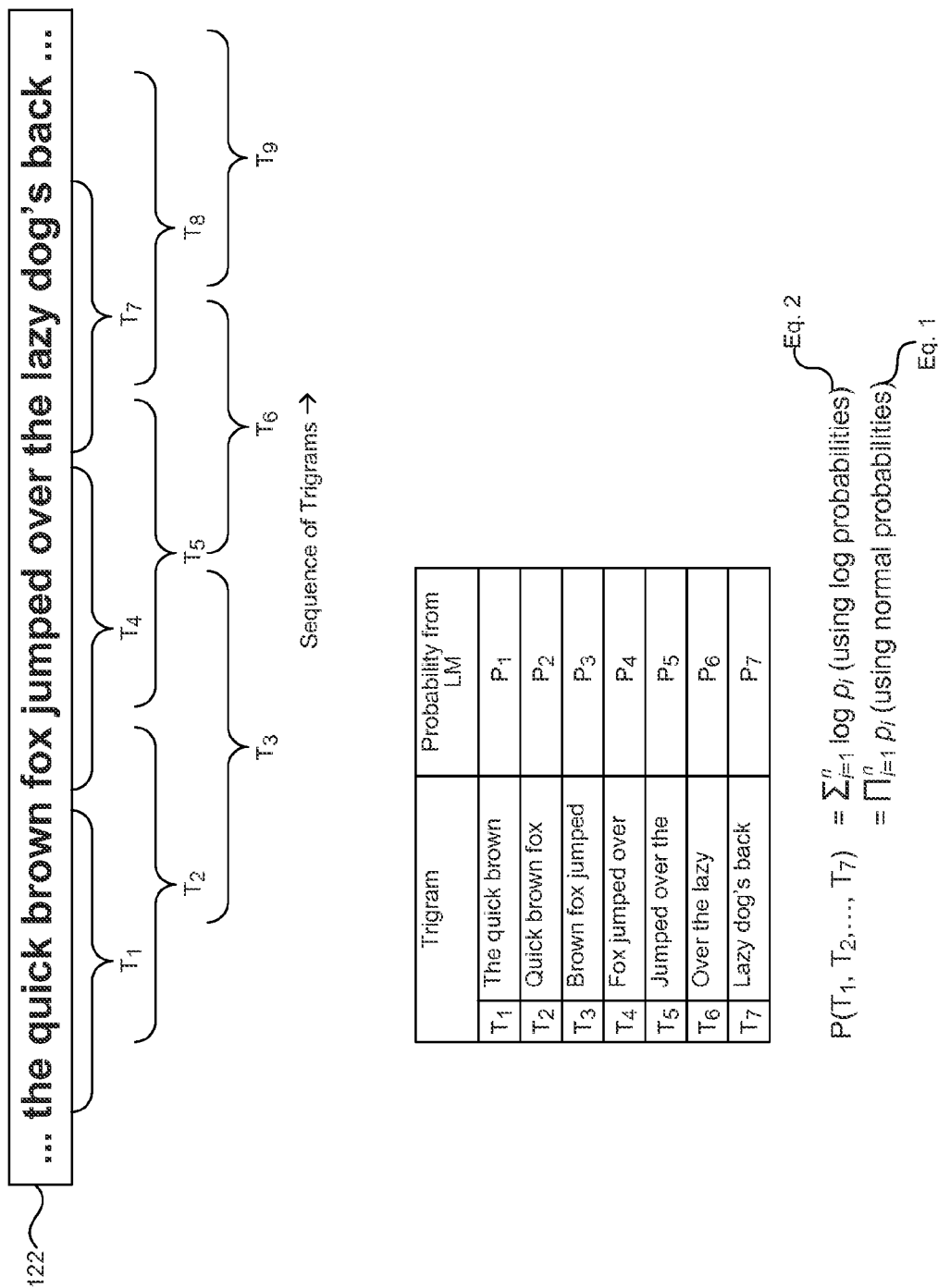
FIG. 2 is an exemplary illustration of the operation of the language model employed by the speech recognition system of FIG. 1.

By way of background, the continuous speech recognition system 100 uses the language model to score a sequence of words. For example, as shown in FIG. 2, the word sequence 122 "the quick brown fox jumped over the lazy dog's back" can be decomposed into overlapping trigrams $T_{1-n}$. Trigram $T_1$ is "the quick brown", trigram $T_2$ is "quick brown fox", etc. Each trigram T has a probability P of occurring. The probabilities $P_{1-n}$ of the trigrams $T_{1-n}$ can be calculated from the LM 101. Thus, trigram $T_1$ has a probability $P_1$. Thus, the probability of occurrence of trigrams $T_1$ to $T_7$ (in this example) is the product of $P_{1-7}$ (or generically $P_{1-n}$) as shown in algorithm Eq. 1. The probability of occurrence of trigrams $T_1$ to $T_7$ also can be represented as a sum of the logarithmic of the probabilities. Because speech recognition is computationally intensive, it is quicker to work with "log probabilities", and replace expensive multiplications with cheaper summations. With this in mind, the score for a sequence of words is the sum of the (log) probabilities of its sequence of trigrams as shown by Eq. 2 in FIG. 2.

As can be appreciated, any particular word sequence has a specific probability from the LM. Also, for purposes of the background, operation of the continuous speech recognition system 100 is described using the generic or original LM 101, but one of skill in the art would recognize on reading the disclosure that the generic or original LM 101 could be replaced by the modified generic LM 101$_1$ or the user specific minimally complete LM 120 as will be described below.

Figure 3:
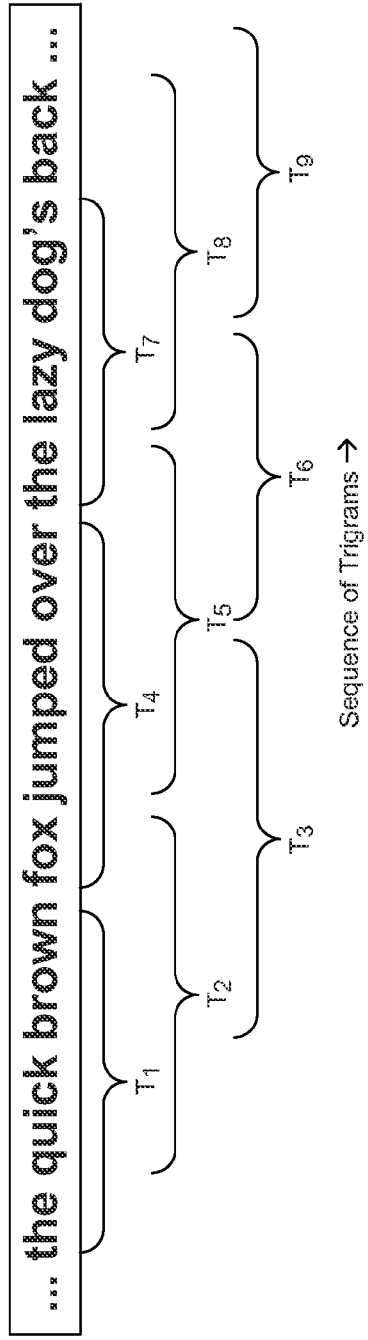
FIG. 3 is an exemplary illustration of the operation of the language model employed by the speech recognition system of FIG. 1.

FIG. 3 generally shows the same information as FIG. 2 but the probabilities are shown as the log of the probabilities such that $P_{1-n}$ has been replaced by the Log $P_{1-n}$ or, in this particular example, Log $P_{1-7}$. As noted above, the sequence of words that a recognizer returns is one with the highest combined scores from the audio analysis (HMM) and LM. Consequently, different LMs may produce different results for a given piece of audio. This leads to the question of given two LM's, which one is a better fit for a particular user? One way to answer that question would be to run segments of audio once through a continuous speech recognition system 100 configured with each of the two generic LMs 101 (a first generic LM 101 and a second generic LM 201) and compare the accuracy of the transcripts. However, this has potential problems, because it involves the acoustic model stored in acoustic model memory 104 as well that uses a hidden Markov model, which may have its own accuracy issues that biases or skews the results. Another approach is to use the two LMs to calculate the average probability of the trigrams in a collection of transcripts for the target user. Intuitively, the LM that is a better fit for the user's pattern of speech will have a higher average probability for the trigrams in the collection. By way of illustration, for the sentence "the quick brown fox jumped over the lazy dog's back", we would calculate the average (log) probability as shown by Eq. 3 in FIG. 3.

It is convenient to use the absolute value of Eq. 3 because logarithms of numbers between 0 and 1 are always negative. This form of the average probability is conventionally known in the art as the perplexity. Higher average probabilities correspond to lower perplexities—the reason is that the logarithm of a number close to zero is a large negative number, and when we take its absolute value, we get a large positive number. Putting this altogether, if we compare two LMs for a particular user, then the better one has a higher average probability, or lower perplexity. It is known in the field of speech recognition that lower values of perplexity correlate with greater recognition accuracy. The technology of the present application creates lower perplexity by providing a user specific minimally complete language model 120 as will be explained further below. The user specific minimally complete language model 120 eliminates unused n-grams from the generic LM 101 or the modified generic LM 101$_1$. The probabilities of the deleted n-grams are redistributed over the remaining n-grams, which makes the probability of the remaining n-grams being the correct n-grams bigger and reduces or lowers the perplexity.

Figure 4:
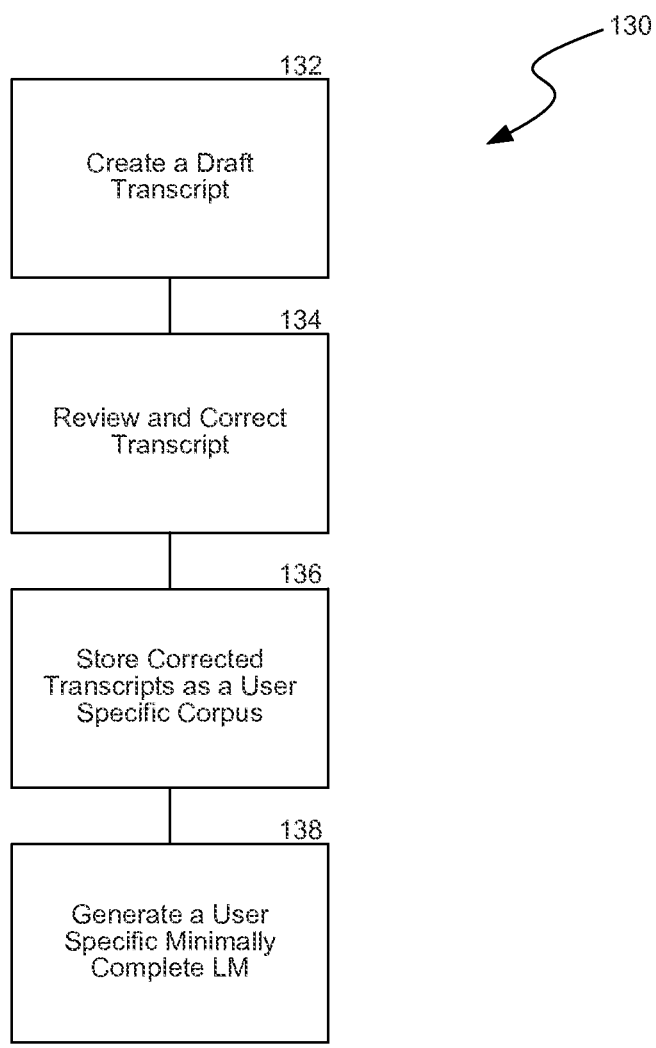
FIG. 4 is a flowchart illustrative of a methodology of modifying a generic language model used by the speech recognition system of FIG. 1.

With reference to FIG. 4, a flowchart 130 is provided showing the generation of a user specific minimally complete language model 120. In a typical dictation/transcription workflow, the continuous speech recognition system 100 creates draft transcripts using the generic LM 101, step 132. A transcriptionist reviews the draft transcripts and makes any necessary corrections, step 134. The corrected transcripts are stored electronically as a user specific corpus 136. As time goes on, there is an accumulating collection of corrected transcripts that are specific to the user. The user specific corpus 136 is used to generate a user specific language model 120, step 138. The user specific LM 120 may be generated using the same method and analyzer that was used to produce the original LM 101. The original LM 101 and the user specific minimally complete LM 120 may be compared by looking at the differences in the various n-grams. In other words, the original LM 101 will have the aforementioned "too many" and "too few" n-grams. Thus, for example, the differences in the models may be express by:

$$DM_1 = (\text{original LM 101}) - (\text{user specific minimally complete LM 120}) \quad \text{EQ. 4.}$$

$$DM_2 = (\text{user specific LM 120}) - (\text{original LM 101}), \quad \text{EQ. 5}$$

Figure 5:
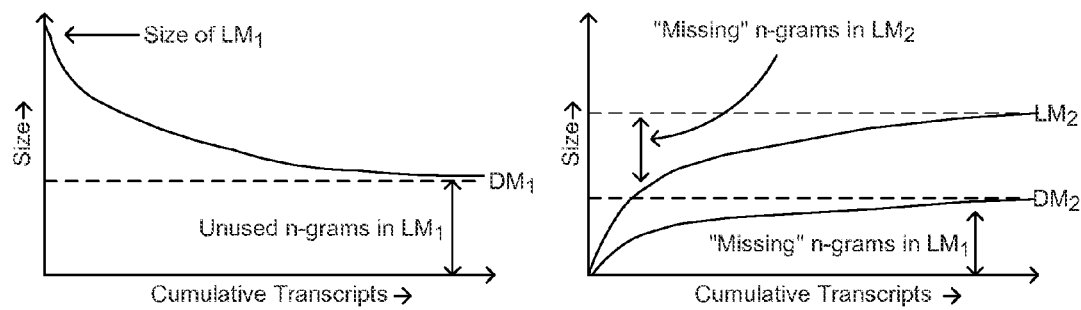
FIG. 5 is an asymptote of the language models.

$DM_1$ comprises the n-grams present in original LM 101 but not contained in the user specific LM 120, which is the so called "too many" n-grams. $DM_2$ comprises the n-grams present in the user specific LM 120 but not contained in the original LM 101, which is the so called "too few" n-grams. The differences in the models $DM_1$ and $DM_2$ can be represented graphically as shown in FIG. 5. Note that in FIG. 5, the x-axis tracks the cumulative new transcripts rather than time, because it makes more sense to track changes in terms of incremental increases in the user specific corpus. Over time, the graphs should approach asymptotes as shown as the user specific corpus will eventually run out of "new" n-grams in the edited transcripts. Thus, the first graph, which tracks the size of $DM_1$, starts out with the same size as LM 101 and declines over time as we see more and more n-grams from the speaker's actual use. Eventually, we have seen all the n-grams that the speaker actually uses. This, leaves a residue of n-grams which are in LM 101 but never actually used by the speaker—these are the unused n-grams or the "too many" n-grams as mentioned above. The bigger the number of unused n-grams, the more likely it is that they will appear in transcription and, therefore, require correction. The second graph tracks the size of both the user specific LM 120 and $DM_2$ that are expected to grow over time and eventually plateau. The user specific LM 120 contains only the n-grams that the speaker uses. $DM_2$ becomes the set of missing n-grams from generic or original LM 101, which means that the speech recognition system 100 using original LM 101 will likely contain errors in and lead to corrections of the transcriptions.

As mentioned above, the plots approach asymptotes. However, at any given point in time, it is difficult to know what the asymptotic values are or whether the values are being approached. However, the problems of calculating and plotting the asymptotes for the curves is well understood in mathematics. One simple approach to estimate the asymptotic values is to fit a curve to the points on the graph that have already been plotted. For example, a curve which contains an exponentially decaying term—a variation on $y = A(1 - e^{-\alpha t})$. To one skilled in the art of curve fitting, there are known techniques to calculate such curves, and even to those not skilled in the art, common programs, such as MS Excel, can fit curves to data sets as the data is available. Additionally, and with no loss of generality, the foregoing discussion can be applied to each order of n-grams within the LM, and individual graphs can be plotted for the unused and missing unigrams, bigrams, and trigrams rather than the accumulation of all the n-grams.

Figure 6:
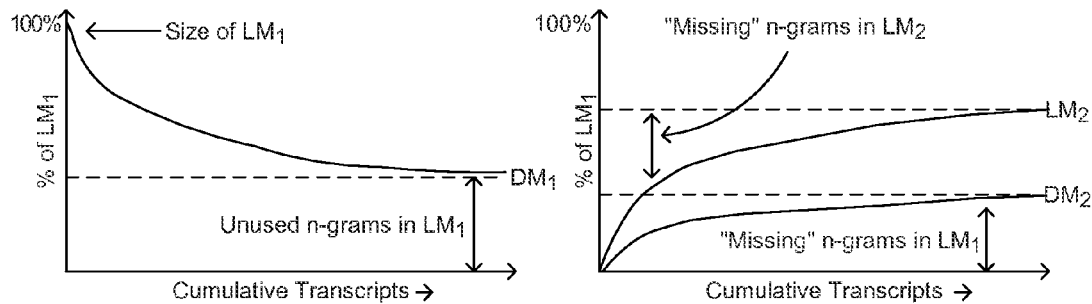
FIG. 6 is an asymptote of the language models.

With reference to FIG. 6, the asymptotic plots are recast with the y-axis as a percentage rather than an absolute number of n-grams. For example, all the n-grams of the original LM 101 would be set as the 100% value. The remaining percentages are normalized with respect to the setting of the original LM 100 as the 100% value. Again, these graphs can be plotted for all n-grams together (as shown and described), or the unigrams, bigrams, trigrams, etc. separately. When expressed as a percentage of the original LM 101, the asymptotes of the plotted graphs tell us the percentage of unused and missing n-grams relative to the original LM 101. Similarly, by fitting a curve to the plotted points of user specific LM 120, it is possible to estimate the percentage of n-grams missing from user specific LM 120. Once the user specific LM 120 is complete (i.e., no additional n-grams are being added), it is axiomatic that the user specific LM 120 is a better language model than the original LM 101 as it would have a lower perplexity. However, it is difficult to determine when the user specific LM 120 is complete. Thus, the technology of the present application determines whether the speech recognition system 100 should retain the original or generic LM 101, or replace the original LM 101 with a modified generic LM 101 that includes the accumulated transcripts from speakers (i.e. combine these transcripts with the corpus used to calculate LM 101), or switch to using the user specific LM 120?

One way to find out is to transcribe audio using each of the original LM 101, the modified generic LM 101$_1$, and the user specific LM 120, compare the relative accuracy, and decide which language model to use.

Another approach is to estimate the values of $M_1$, where $M_1$ stands for the n-grams missing from the generic LM 101, and $M_2$, where $M_2$ stands for the n-grams missing from the user specific LM 120. Initially, $M_2 > M_1$ as the corpus for the user specific LM 120 is built. At some point, however, the corpus of material used to generate the user specific LM 120 will have accumulated enough transcripts such that $M_2 < M_1$ which would imply a lower error rate for transcripts generated by the user specific LM 120. Thus, when $M_2 < M_1$ a decision may be implemented such that the continuous speech recognition system 100 switches the language model 101 to the user specific LM 120, which may still be missing n-grams but fewer missing n-grams than the original LM 101. Indeed, eventually there will come the point where our estimated value of $M_2$ falls beneath some threshold value, e.g., 1 or 2%, and we can switch to the user specific LM 120 and expect acceptable accuracy even when $M_2 < M_1$ because the generic LM 101 still has "too many" n-grams that introduce errors in the transcriptions. Notice that if we periodically rebuild the generic LM 101 into the modified generic LM 101$_1$ by including the accumulated transcripts from the speaker, the value of $M_1$ approaches zero, and the accuracy tradeoff between modified generic LM 101$_1$ and the user specific LM 120 is due to the errors produced by the modified generic LM 101$_1$ containing n-grams that the speaker never uses. In other words, the accuracy tradeoff is between errors due to $U_1$, where $U_1$ stands for unused n-grams in the modified generic LM 101$_1$, and $M_2$. The impact of the unused (or the aforementioned "too many") n-grams $U_1$ depends in part on how well the audio profile discriminates phonemes. The poorer the discrimination, the more likely it is that the recognizer will choose incorrect n-grams, which may include n-grams in $U_1$, which will result in an error. The quality of the audio profile can be parameterized as a factor "$\alpha$", so that $M_2 < \alpha U_1$ would indicate transcriptions generated using the user specific LM 120 would be more accurate than using the modified generic LM 101. Obtaining the value a is generally known in the art and will not be further discussed herein.

Theoretically, if the user specific LM 120 was, in fact, complete (in other words, it contained all the n-grams the user actually uses and no more), then theoretically, the user specific LM 120 should be used to replace either the generic LM 101 or the modified generic LM 101$_1$. Thus, the following provides exemplary process flowcharts illustrative of methodologies that choose whether: (a) to generate the modified generic LM 101$_1$, which is the generic LM 101 including content from the accumulated transcriptions from the speaker; or, (b) to switch to the user specific LM 120; or, (c) wait until more transcripts have accumulated. At some point, however, the continuous speech recognition system 100 should make the switch to transcribing using the then current version of the user specific LM 120, which by definition is the minimal LM for the speaker. Notice that it also has a lower perplexity than any of the intermediate LMs, meaning that transcriptions using the user specific LM 120 should be more accurate than using any of the other LMs, which include the generic LM 101 and the modified generic LM 101$_1$.

Figure 7:
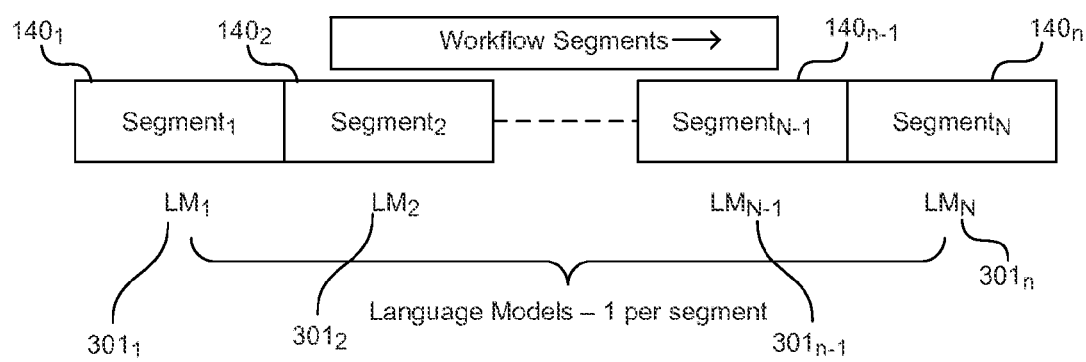
FIG. 7 is an exemplary illustration of a segmented workflow having a specific language model for each segment.
Figure 7A:
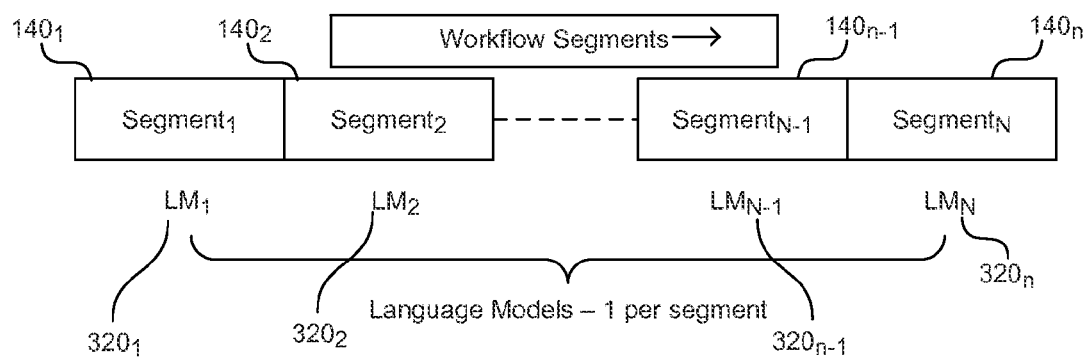
FIG. 7A is an exemplary illustration of a segmented workflow having a user specific language model for each segment.

While the above description has been useful for a speech recognition system 100 using a language model to convert audio, a person of ordinary skill in the art should recognize now on reading the disclosure that many users have workflows that can be broken down into distinct segments 140$_{1-n}$ as shown in FIG. 7. For example, a health care provider might dictate a SOAP note, which has four sections corresponding to: Subjective, Objective, Assessment, and Plan (SOAP is an acronym). Each section of the SOAP note can be treated as a separate dictation task, and transcribed using a separate LM 301$_{1-n}$ (a generic LM for the specific task in the workflow). In which case, the process described above to create a minimal LM can be applied to each of the four sections. This process may be generalized for the speech recognition system operating with a user whose work flow has N distinct segments, and deploys a separate LM for each segment. Initially, as explained above, the continuous speech recognition system 100 uses generic or original (a/k/a default) LMs for each segment, and then follows the methodology described above to create a user specific LM 320$_{1-n}$ for each segment 140$_{1-n}$ as shown in FIG. 7A. Intuitively, the continuous speech recognition system 100 should achieve higher accuracy using the user specific LMs 320, and indeed because each user specific LM is a subset of the minimal LM for the entire workflow, it is clear that the continuous speech recognition system 100 would have a lower value of perplexity as compared to the generic LMs 101 or an omnibus minimal LM 320 that was the sum of the user specific LMs 320$_{1-n}$. Additionally, if the use of the user specific LM that is specialized for each segment should have a lower perplexity value and higher accuracy than using a user specific LM for the entire workflow as a user may use certain n-grams in one part of the workflow but not in other parts of the workflow as the entire workflow user specific LM, or omnibus LM, would have unused n-grams in each segment.

Figure 8:
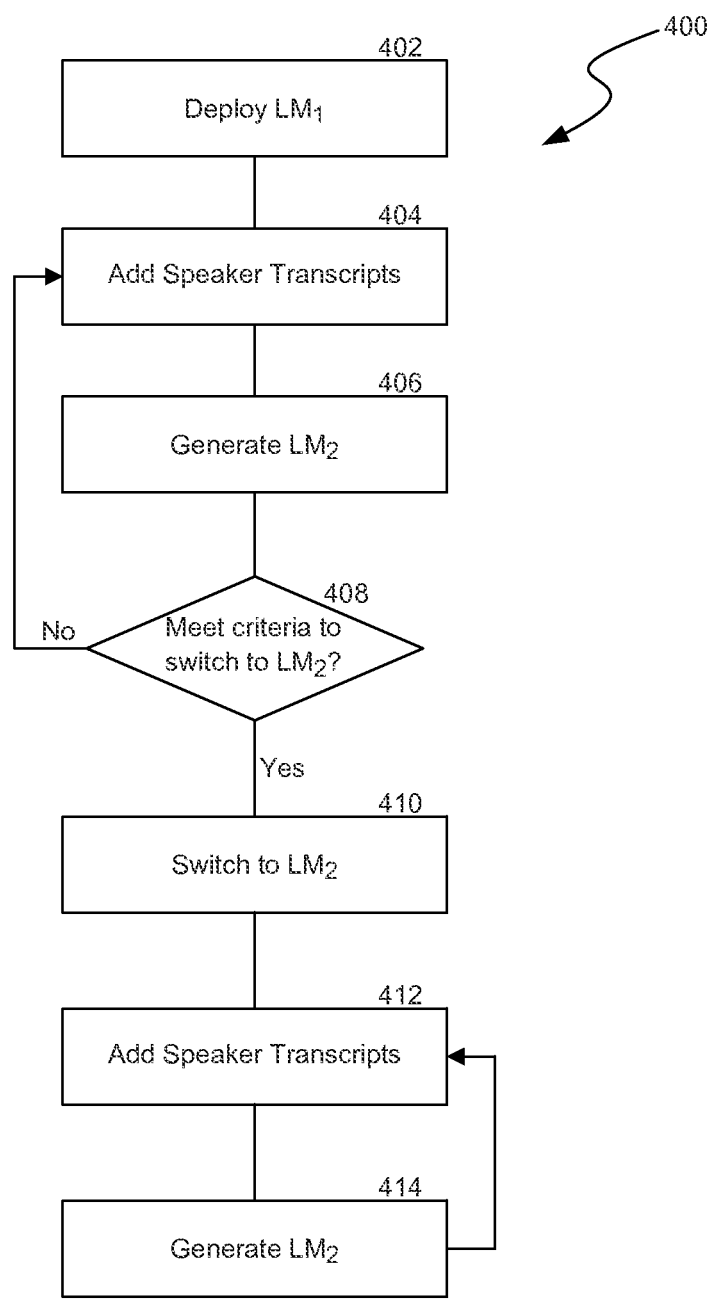
FIG. 8 is a flowchart illustrative of a methodology of deploying a speech recognition system with a first language model and replacing the first language model with a second language model.
Figure 9:
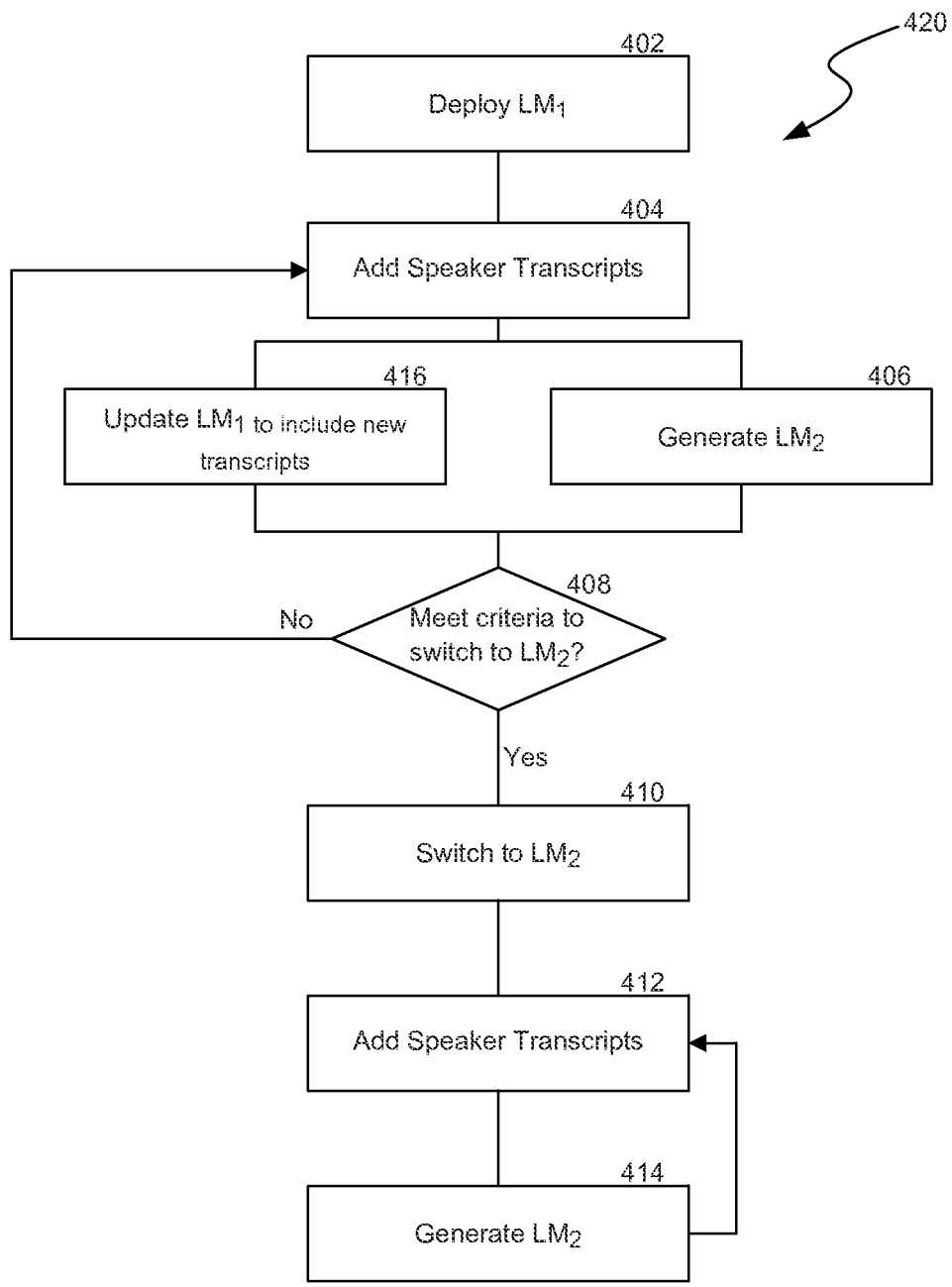
FIG. 9 is a flowchart illustrative of a methodology of deploying a speech recognition system with a first language model and replacing the first language model with a second language model.

With reference now to FIGS. 8 and 9, flowcharts 400 and 420 are provided. The flowcharts 400 and 420 show exemplary methodologies of creating and deploying a user specific LM. While the flowcharts are provided with a number of discrete steps for convenience, one of ordinary skill in the art will now recognize that many of the steps may be divided into multiple steps and many of the steps may be combined into a single step. Moreover, while shown in a particular order or arrangement, the steps as outlined herein may be performed in a number of orders without departing from the spirit and scope of the present application. For convenience, the flowcharts refer to the generic or original LM and the modified generic LM as $LM_1$ and the user specific LM as $LM_2$. The flowchart 400 assumes that the continuous speech recognition system is deployed with $LM_1$ and is in use by a particular or identifiable user to generate transcripts, step 402. The generated transcripts are corrected and added to a corpus of user specific transcripts, step 404. Next, the corpus of user specific transcripts are generated into a language model $LM_2$ using the same processes as used to generate $LM_1$, step 406. Once $LM_2$ is generated, it is determined whether $LM_2$ should be used in place of $LM_1$ moving forward, step 408. If it is determined that the continuous speech recognition system should continue to use the deployed $LM_1$, the process returns to collecting additional transcripts for the corpus of material, step 404. If it is determined that the continuous speech recognition system should deploy $LM_2$, the continuous speech recognition system discontinues use of $LM_1$ and deploys $LM_2$, step 410. Once the continuous speech recognition system deploys $LM_2$, new transcripts generated using $LM_2$ are collected, step 412, and used to create an updated $LM_2$ to capture additional new n-grams, step 414. With reference specifically to FIG. 9 and flowchart 420, the process flow is essentially the same as flowchart 400 but includes step 416. Step 416 comprises generating the modified generic LM (also designated $LM_1$) using the corpus of user specific transcripts.

Figure 10:
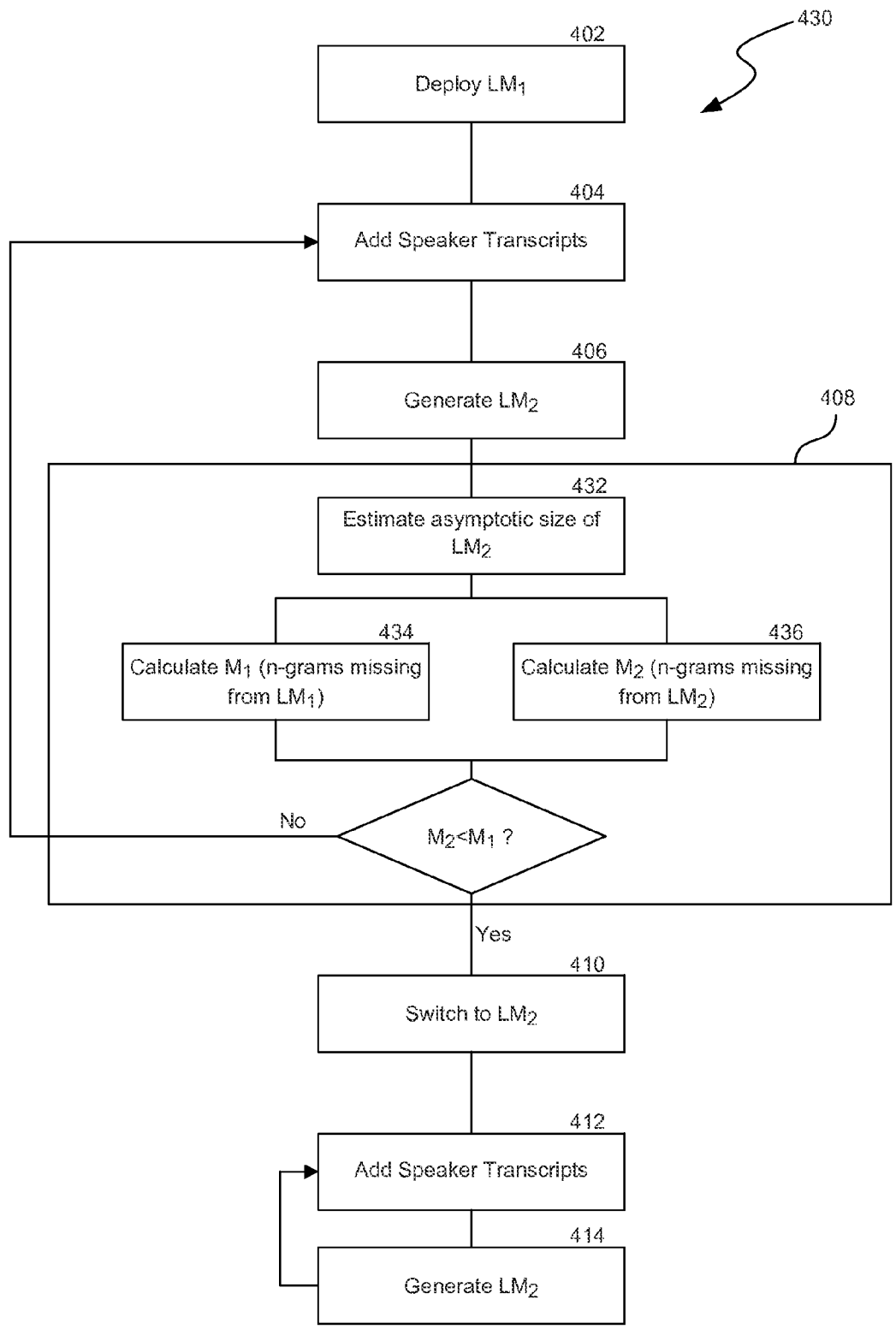
FIG. 10 is a flowchart illustrative of a methodology of deploying a speech recognition system with a first language model and replacing the first language model with a second language model.

The evaluation criteria used to determine whether to switch from $LM_1$ to $LM_2$ can be any of the above mentioned ways described above including, for example, determining that $LM_2$ should have a lower perplexity value than $LM_1$, which indicates a higher average probability of matching correct word sequences. FIG. 10 shows flowchart 430 that determines whether to switch from $LM_1$ to $LM_2$ is dependent on which language model is missing more n-grams. Thus, the process flow for flowchart 430 is the same as the process flow for flowchart 400. The determination step 408 of the process flowchart 400 is explained in flowchart 430 and includes first determining or estimating the asymptotic size of $LM_2$, step 432. Determining the size of $LM_2$ is generally within the skill of art for plotting best fit curves. Next, as explained above, the processor calculates the number of n-grams used by the specific speaker that are missing from $LM_1$, which was defined as $M_1$ earlier, step 434. The processor also calculates the number of n-grams used by the specific speaker that are currently missing from $LM_2$, which was defined as $M_2$ earlier, step 436. Next, it is determined whether $M_2$ is less than $M_1$, step 438. If $M_2$ is less than $M_1$, then the process flow moves to step 410 as described above with respect to flowchart 400. If $M_2$ is greater then or equal to $M_1$, than the process flow moves to step 404 as described above. Notice, while flowchart 430 shows switching from $LM_1$ to $LM_2$ when $M_2$ is less than $M_1$, the switch may occur when $M_2$ is equal to $M_1$ as it would be expected that $LM_2$ would be more accurate as it does not contain n-grams that the speaker/user does not utter as does $LM_1$. In that regard, using $LM_2$ may be more accurate when $M_2$ is slightly greater than $M_1$ for the same reason (in other words, the error from excess n-grams in $LM_1$ outweighs the fact that $LM_1$ is missing fewer n-grams) such that in certain embodiments, it is acceptable to switch from $LM_1$ when $M_2$ is greater then $M_1$. Thus, in these embodiments, the decision to deploy $LM_2$ may be made when $M_2$ is less than $\alpha M_1$, where is an appropriately chosen scale factor which would typically be a little larger than 1.0.

Figure 11:
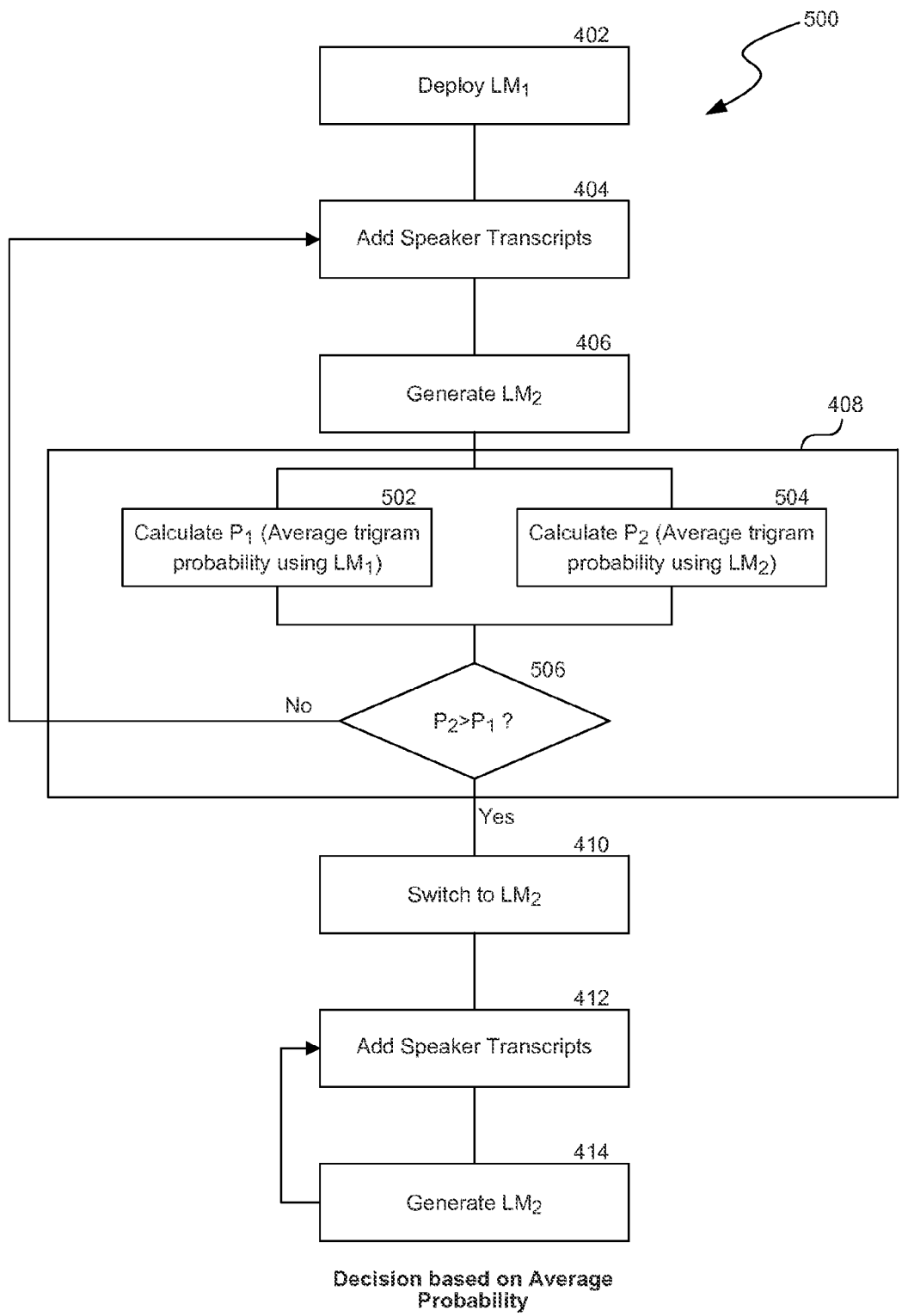
FIG. 11 is a flowchart illustrative of a methodology of deploying a speech recognition system with a first language model and replacing the first language model with a second language model.
Figure 12:
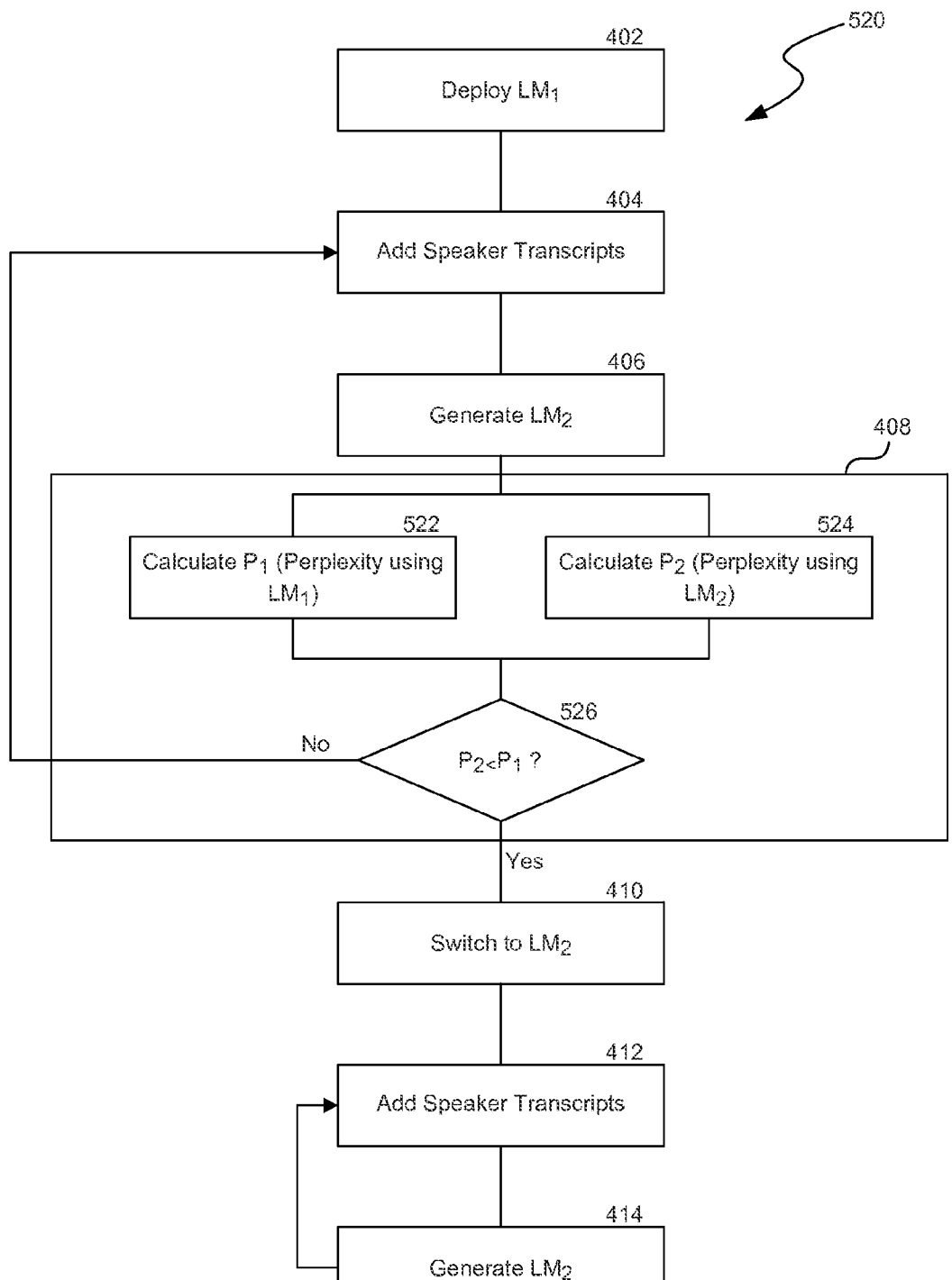
FIG. 12 is a flowchart illustrative of a methodology of deploying a speech recognition system with a first language model and replacing the first language model with a second language model.

FIGS. 11 and 12 show flowcharts 500 and 520 that are exemplary flowcharts of additional exemplary determinations of when to switch from $LM_1$ to $LM_2$. Flowcharts 500 and 520 have process flows similar to flowchart 400 described above. In this case, the determination step 408 includes determining either the average probability of a trigram, or its equivalent formulation, perplexity, as the criteria for switching between $LM_1$ and $LM_2$. At the determination point, $LM_1$ and $LM_2$ are used to calculate the average probabilities of a trigram, steps 502, 504. We source the sample trigrams from the accumulated transcripts. In flowchart 520, instead of probabilities, the determination step calculates the perplexities, step 522, 524. Next, it is determined whether the average probability using $LM_2$ is now higher than that using $LM_1$, step 506. If the average probability using $LM_2$ is higher, the continuous speech recognition system switches to using $LM_2$ for transcription and the process moves to step 410. Otherwise, the process flow returns to step 404. Similarly, if perplexity is used, the processor determines whether the perplexity of $LM_2$ is less than the perplexity of $LM_1$, step 526. If the perplexity of $LM_2$ is less, the system switches to $LM_2$ and proceeds to step 410 in the process flow. Otherwise, the system maintains $LM_1$ and the process flow returns to step 404. After switching to $LM_2$ we can continue to accumulate corrected transcripts and periodically rebuild $LM_2$ to incorporate the new corpus. As with the other scenarios, we eventually come to the point where $LM_2$ is close enough to its asymptote that it is no longer worth the cost to rebuild it, or, alternately, there is a gradual evolution of terminology which warrants a periodic rebuild of $LM_2$.

Figure 13:
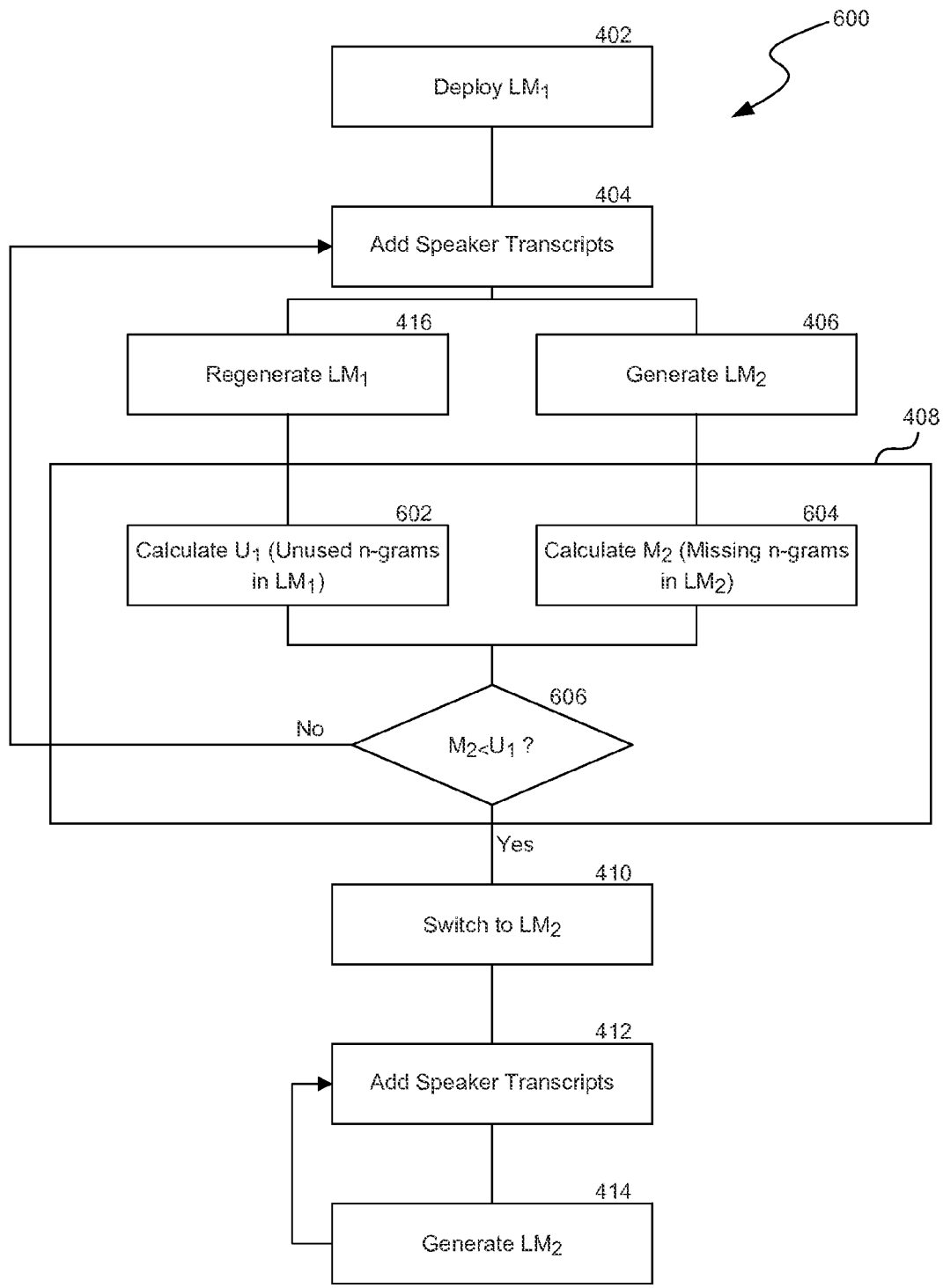
FIG. 13 is a flowchart illustrative of a methodology of deploying a speech recognition system with a first language model and replacing the first language model with a second language model.

With reference now to FIG. 13, another exemplary determination of when to switch from $LM_1$ to $LM_2$ is shown in flowcharts 600. Flowcharts 600 generally follow the same flow as flowchart 420 described above. In flowchart 600, the criterion used to decide whether to switch from $LM_1$ to $LM_2$ is to compare the effect on accuracy resulting from the number of unused n-grams in $LM_1$ with the number of missing n-grams in $LM_2$ directly. As noted in the earlier discussion, the impact of an unused n-gram is that it can appear by mistake, and the more unused n-grams there are, the more likely it is that one of them will be recognized in preference to an actual n-gram. Similarly, the more n-grams that are missing from $LM_2$, the more likely it is that the speaker will say one of them, which may result in an error, because $LM_2$ may not return a missing n-gram. To compare the number of unused n-grams in $LM_1$ with the number of missing n-grams in $LM_2$, the audio quality parameterized factor $\alpha$ is used as a constant multiplication factor and, one possible test, is whether $M_2 < \alpha U_1$. When $M_2 < \alpha U_1$, the system switches to using $LM_2$ for future transcriptions. Assuming $LM_2$ still has some missing n-grams, $LM_2$ is regenerated from time to time with newly accumulated transcripts. Flowchart 600, thus, includes steps 402 to 416 as described above for flowchart 420. The determination step 408 is exploded to include calculating the unused n-grams in $LM_1$, which was described above as $U_1$, step 602. The processor also calculates $M_2$ as described above, step 604. Next, it is determined whether $M_2 < \alpha U_1$, step 606. If $M_2 < \alpha U_1$, then the processor switches from $LM_1$ to $LM_2$ and proceeds to step 410. If $M_2 \geq \alpha U_1$, then the process flow returns to step 404. As in previous cases, $LM_2$ approaches its asymptote and there will come a point where it is no longer worth regenerating $LM_2$, or, alternatively, there is a gradually evolution of terminology, which will require occasional rebuilds of $LM_2$ to reflect these changes.

Figure 14:
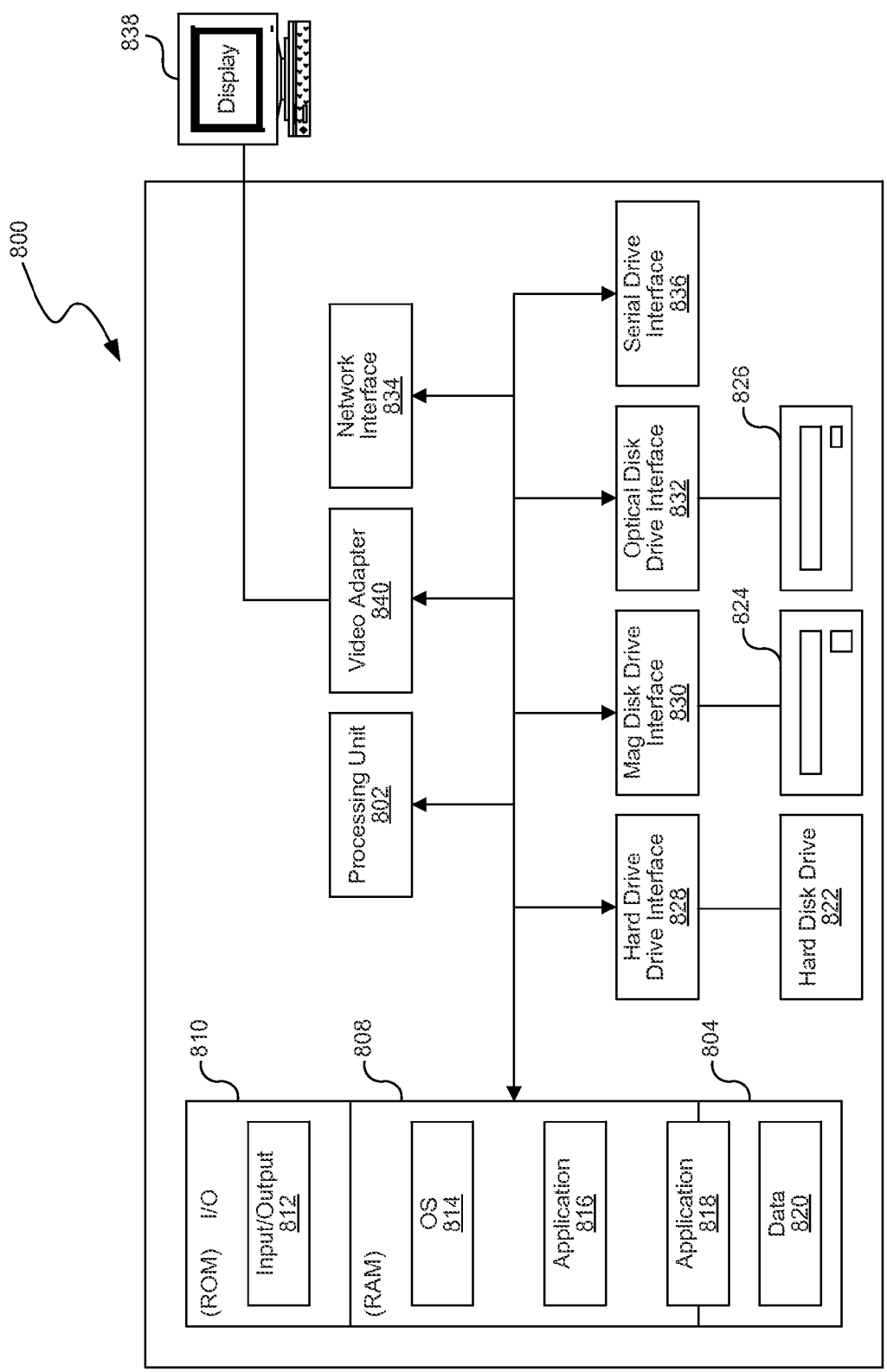
FIG. 14 is a functional block diagram of a device on which the technology of the present application may be implemented.

Referring now to FIG. 14, a functional block diagram of a typical client device 800 for the technology of the present application is provided. Client device 800 is shown as a single, contained unit, such as, for example, a desktop, laptop, handheld, or mobile processor, but client device 800 may comprise portions that are remote and connectable via network connections such as via a LAN, a WAN, a WLAN, a WiFi Network, Internet, or the like. Generally, client device 800 includes a processor 802, a system memory 804, and a system bus 806. System bus 806 couples the various system components and allows data and control signals to be exchanged between the components. System bus 806 could operate on any number of conventional bus protocols. System memory 804 generally comprises both a random access memory (RAM) 808 and a read only memory (ROM) 810. ROM 810 generally stores a basic operating information system such as a basic input/output system (BIOS) 812. RAM 808 often contains the basic operating system (OS) 814, application software 816 and 818, and data 820. System memory 804 contains the code for executing the functions and processing the data as described herein to allow the present technology of the present application to function as described. Client device 800 generally includes one or more of a hard disk drive 822 (which also includes flash drives, solid state drives, etc. as well as other volatile and non-volatile memory configurations), a magnetic disk drive 824, or an optical disk drive 826. The drives also may include zip drives and other portable devices with memory capability. The drives are connected to the bus 806 via a hard disk drive interface 828, a magnetic disk drive interface 830 and an optical disk drive interface 832, etc. Application modules and data may be stored on a disk, such as, for example, a hard disk installed in the hard disk drive (not shown). Client device 800 has network connection 834 to connect to a local area network (LAN), a wireless network, an Ethernet, the Internet, or the like, as well as one or more serial port interfaces 836 to connect to peripherals, such as a mouse, keyboard, modem, or printer. Client device 800 also may have USB ports or wireless components, not shown. Client device 800, typically, has a display or monitor 838 connected to bus 806 through an appropriate interface, such as a video adapter 840. Monitor 838 may be used as an input mechanism using a touch screen, a light pen, or the like. On reading this disclosure, those of skill in the art will recognize that many of the components discussed as separate units may be combined into one unit and an individual unit may be split into several different units. Further, the various functions could be contained in one personal computer or spread over several networked personal computers. The identified components may be upgraded and replaced as associated technology improves and advances are made in computing technology. The speech recognition engines may have similar constructions.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The above identified components and modules may be superseded by new technologies as advancements to computer technology continue.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

I claim:

1. A method performed on at least one processor of speech recognition wherein the speech recognition system replaces a generic language model with a user specific language model, comprising:
    receiving analog audio from a specific speaker;
    digitizing the analog audio to generate a corpus of material associated with the specific speaker;
    receiving a user specific language model that is formed from the corpus of material associated with the specific speaker;
    determining whether a continuous speech recognition system should use a generic language model or the user specific language model, wherein the step of determining comprises:
        estimating an asymptotic size of the user specific language model;
        calculating a number of user specific n-grams missing from the generic language model;
        calculating a number of user specific n-grams missing from the user specific language model; and
        determining whether the number of user specific n-grams missing from the user specific language model is less than a parameterization factor times the number of user specific n-grams missing from the generic language model; and
    if it is determined that the continuous speech recognition system should use the generic language model, repeating the receiving step and the determining step until it is determined that the continuous speech recognition system should use the user specific language model; and
    if it is determined that the continuous speech recognition system should use the user specific language model, causing the continuous speech recognition system to replace the generic language model with the user specific language model.

2. The method of claim 1 further comprising the step of updating the user specific language model.

3. The method of claim 1 wherein the user specific language model comprises only n-grams spoken by the specific speaker.

4. The method of claim 1 wherein the continuous speech recognition comprises a segmented speech recognition system having a plurality of segments and a plurality of generic language models and wherein the receiving step receives a user specific language model for each of the plurality of segments and the determination step is completed for each generic language model and its corresponding user specific language model.

5. The method of claim 1 wherein the generic language model comprises new n-grams developed from transcripts of the audio of the specific speaker.

6. The method of claim 1 wherein the step of determining comprises determining the number of user specific n-grams missing from the user specific language model is less than or equal to the number of user specific n-grams missing from the generic language model.

7. The method of claim 6 wherein the step of determining comprises determining the number of user specific n-grams missing from the user specific language model is less than the number of user specific n-grams missing from the generic language model.

8. An apparatus for speech recognition comprising:
    at least one processor;
    at least one memory operatively coupled to the at least one processor;
    at least one analog to digital converter to convert analog audio from a specific user into digital audio data comprising a corpus of material; and
    an audio data port operatively coupled to the processor to receive the digital audio data;
    wherein the at least one processor comprises a search engine;
    wherein the at least one memory comprises an acoustic model memory, a language model memory, and a lexicon dictionary memory, the language model memory comprising a language model wherein the language model initially comprises a generic language model generated from the corpus of material; and
    wherein the processor comprises:
        a receiving module configured to receive a user specific language model;
        a determining module configured to determine whether to replace the generic language model with the user specific language model for the specific user;
        an estimation module configured to estimate an asymptotic size of the user specific language model; and
        a calculation module configured to calculate a number of user specific n-grams missing from the generic language model and a number of user specific n-grams missing from the user specific language model;
        wherein the determining module determines whether to replace the generic language model with the user specific language model when the number of user specific n-grams missing from the user specific language model is less than or equal to the number of user specific n-grams missing from the generic language model.

9. A method performed on at least one processor of speech recognition wherein the speech recognition system replaces a generic language model with a user specific language model, comprising:
    receiving analog audio from a specific speaker;
    digitizing the analog audio to generate a corpus of material associated with the specific speaker;
    receiving a user specific language model that is formed from the corpus of material associated with the specific speaker;
    determining whether a continuous speech recognition system should use a generic language model or the user specific language model, wherein the order of the language model is N and the step of determining comprises:
        calculating an average N-gram probability using the generic language model;
        calculating an average N-gram probability using the user specific language model; and
        determining whether the average N-gram probability using the user specific language model is greater than or equal to the average trigram probability using the generic language model; and
    if it is determined that the continuous speech recognition system should use the generic language model, repeating the receiving step and the determining step until it is determined that the continuous speech recognition system should use the user specific language model; and if it is determined that the continuous speech recognition system should use the user specific language model, causing the continuous speech recognition system to replace the generic language model with the user specific language model.

10. The method of claim 9 further comprising the step of updating the user specific language model.

11. The method of claim 9 wherein the user specific language model comprises only n-grams spoken by the specific speaker.

12. The method of claim 9 wherein the continuous speech recognition comprises a segmented speech recognition system having a plurality of segments and a plurality of generic language models and wherein the receiving step receives a user specific language model for each of the plurality of segments and the determination step is completed for each generic language model and its corresponding user specific language model.

13. The method of claim 9 wherein the generic language model comprises new n-grams developed from transcripts of the audio of the specific speaker.

14. A method performed on at least one processor of speech recognition wherein the speech recognition system replaces a generic language model with a user specific language model, comprising:
   receiving analog audio from a specific speaker;
   digitizing the analog audio to generate a corpus of material associated with the specific speaker;
   receiving a user specific language model that is formed from the corpus of material associated with the specific speaker;
   determining whether a continuous speech recognition system should use a generic language model or the user specific language model, wherein the step of determining comprises:
      calculating a perplexity of the generic language model;
      calculating a perplexity of the user specific language model; and
      determining whether the perplexity of the user specific language model is less than or equal to the perplexity of the generic language model; and
   if it is determined that the continuous speech recognition system should use the generic language model, repeating the receiving step and the determining step until it is determined that the continuous speech recognition system should use the user specific language model; and
   if it is determined that the continuous speech recognition system should use the user specific language model, causing the continuous speech recognition system to replace the generic language model with the user specific language model.

15. The method of claim 14 further comprising the step of updating the user specific language model.

16. The method of claim 14 wherein the user specific language model comprises only n-grams spoken by the specific speaker.

17. The method of claim 14 wherein the continuous speech recognition comprises a segmented speech recognition system having a plurality of segments and a plurality of generic language models and wherein the receiving step receives a user specific language model for each of the plurality of segments and the determination step is completed for each generic language model and its corresponding user specific language model.

18. The method of claim 14 wherein the generic language model comprises new n-grams developed from transcripts of the audio of the specific speaker.

19. A method performed on at least one processor of speech recognition wherein the speech recognition system replaces a generic language model with a user specific language model, comprising:
   receiving analog audio from a specific speaker;
   digitizing the analog audio to generate a corpus of material associated with the specific speaker;
   receiving a user specific language model that is formed from the corpus of material associated with the specific speaker;
   determining whether a continuous speech recognition system should use a generic language model or the user specific language model, wherein the step of determining comprises:
      calculating a number of unused n-grams in the generic language model;
      calculating a number of missing n-grams in the user specific language model;
      obtaining an audio quality parameterized factor $\alpha$; and
      determining whether the number of missing n-grams in the user specific language model is less than or equal to the multiplication of the audio quality parameterized factor $\alpha$ and the number of unused n-grams; and
   if it is determined that the continuous speech recognition system should use the generic language model, repeating the receiving step and the determining step until it is determined that the continuous speech recognition system should use the user specific language model; and
   if it is determined that the continuous speech recognition system should use the user specific language model, causing the continuous speech recognition system to replace the generic language model with the user specific language model.

20. The method of claim 19 wherein the generic language model is a modified generic language model wherein the modified generic language model comprises user specific n-grams not part of the generic language model.

21. The method of claim 19 further comprising the step of updating the user specific language model.

22. The method of claim 19 wherein the user specific language model comprises only n-grams spoken by the specific speaker.

23. The method of claim 19 wherein the continuous speech recognition comprises a segmented speech recognition system having a plurality of segments and a plurality of generic language models and wherein the receiving step receives a user specific language model for each of the plurality of segments and the determination step is completed for each generic language model and its corresponding user specific language model.

24. The method of claim 19 wherein the generic language model comprises new n-grams developed from transcripts of the audio of the specific speaker.

25. An apparatus for speech recognition comprising:
   at least one processor;
   at least one memory operatively coupled to the at least one processor;
   at least one analog to digital converter to convert analog audio from a specific user into digital audio data comprising a corpus of material; and
   an audio data port operatively coupled to the processor to receive the digital audio data;
   wherein the at least one processor comprises a search engine;
   wherein the at least one memory comprises an acoustic model memory, a language model memory, and a lexicon dictionary memory, the language model memory comprising a language model wherein the language model initially comprises a generic language model generated from the corpus of material; and wherein the processor comprises:
- a receiving module configured to receive a user specific language model;
- a determining module configured to determine whether to replace the generic language model with the user specific language model for the specific user; and
- a calculation module configured to calculate an average trigram probability using the generic language model and an average trigram probability using the user specific language model;
- wherein the determining module determines whether to replace the generic language model with the user specific language model when the average trigram probability using the user specific language model is greater than or equal to the average trigram probability using the generic language model.

26. An apparatus for speech recognition comprising:
at least one processor;
at least one memory operatively coupled to the at least one processor;
at least one analog to digital converter to convert analog audio from a specific user into digital audio data comprising a corpus of material; and
an audio data port operatively coupled to the processor to receive the digital audio data;
wherein the at least one processor comprises a search engine;
wherein the at least one memory comprises an acoustic model memory, a language model memory, and a lexicon dictionary memory, the language model memory comprising a language model wherein the language model initially comprises a generic language model generated from the corpus of material; and
wherein the processor comprises:
- a receiving module configured to receive a user specific language model;
- a determining module configured to determine whether to replace the generic language model with the user specific language model for the specific user; and
- a calculation module configured to calculate a perplexity of the generic language model and a perplexity of the user specific language model;
- wherein the determining module determines whether to replace the generic language model with the user specific language model when the perplexity of the user specific language model is less than or equal to the perplexity of the generic language model.

27. An apparatus for speech recognition comprising:
at least one processor;
at least one memory operatively coupled to the at least one processor;
at least one analog to digital converter to convert analog audio from a specific user into digital audio data comprising a corpus of material; and
an audio data port operatively coupled to the processor to receive the digital audio data;
wherein the at least one processor comprises a search engine;
wherein the at least one memory comprises an acoustic model memory, a language model memory, and a lexicon dictionary memory, the language model memory comprising a language model wherein the language model initially comprises a generic language model generated from the corpus of material; and
wherein the processor comprises:
- a receiving module configured to receive a user specific language model;
- a determining module configured to determine whether to replace the generic language model with the user specific language model for the specific user;
- a calculation module configured to calculate a number of unused n-grams in the generic language model and a number of missing n-grams in the user specific language model; and
- a multiplication module configured to multiply the number of unused n-grams and an audio quality parameterized factor $\alpha$;
- wherein the determining module is configured to determine whether to replace the generic language model with the user specific language model when the number of missing n-grams in the user specific language model is less than or equal to the multiplication of the number of unused n-grams and an audio quality parameterized factor $\alpha$.

* * * * *